(12) United States Patent
Morihira et al.

(10) Patent No.: US 12,722,220 B2
(45) Date of Patent: Sep. 1, 2026

(54) WELDING SYSTEM

(71) Applicant: Hitachi, Ltd., Tokyo (JP)

(72) Inventors: Naoki Morihira, Tokyo (JP); Kazutoshi Sugie, Tokyo (JP); Makoto Ogata, Tokyo (JP); Seunghwan Park, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 643 days.

(21) Appl. No.: 18/265,092

(22) PCT Filed: Oct. 27, 2021

(86) PCT No.: PCT/JP2021/039611

§ 371 (c)(1),
(2) Date: Jun. 2, 2023

(87) PCT Pub. No.: WO2022/118574

PCT Pub. Date: Jun. 9, 2022

(65) Prior Publication Data

US 2024/0100615 A1 Mar. 28, 2024

(30) Foreign Application Priority Data

Dec. 2, 2020 (JP) ................................ 2020-200063

(51) Int. Cl.
*B23K 9/095* (2006.01)
*B23K 9/12* (2006.01)

(52) U.S. Cl.
CPC ............ *B23K 9/0956* (2013.01); *B23K 9/126* (2013.01)

(58) Field of Classification Search
CPC .... B23K 9/0953; B23K 9/0956; B23K 9/126; B23K 9/32; B23K 31/125; B23K 9/287; B25J 9/163

(Continued)

(56) References Cited

U.S. PATENT DOCUMENTS 4,721,947 A * 1/1988 Brown ................. B23K 9/0956 228/103
2017/0028499 A1 2/2017 Yoshida et al.
2021/0138646 A1* 5/2021 Matsushima .......... B25J 9/1684

FOREIGN PATENT DOCUMENTS

JP 5-245636 A 9/1993
JP 8-108270 A 4/1996

(Continued)

OTHER PUBLICATIONS

International Search Report (PCT/ISA/210) issued in PCT Application No. PCT/JP2021/039611 dated Dec. 21, 2021 with English translation (4 pages).

(Continued)

*Primary Examiner* — Phuong T Nguyen
(74) *Attorney, Agent, or Firm* — Crowell & Moring LLP

(57) ABSTRACT

A welding system includes: a setting apparatus configured to move a material to be welded to a desired welding position according to a disturbance condition of the material to be welded 1; a welding robot configured to weld, according to a working condition, the material to be welded moved by the setting apparatus; an inspection apparatus configured to inspect a welding quality of the material to be welded that is welded at a current time; a storage apparatus configured to store the working condition for the current time, the disturbance condition for the current time, and the welding quality of the current time in association with one another; and a determination unit configured to change, when the welding quality of the current time stored in the storage apparatus satisfies a predetermined required quality, the corresponding disturbance condition for the current time and set the changed disturbance condition as a disturbance condition for a next time.

7 Claims, 10 Drawing Sheets

(58) Field of Classification Search
USPC ............... 219/130.32, 130.21, 121.1, 121.11
See application file for complete search history.

(56) References Cited

FOREIGN PATENT DOCUMENTS

| | | | |
|---|---|---|---|
| JP | 2004-223584 | A | 8/2004 |
| JP | 2017-30014 | A | 2/2017 |

OTHER PUBLICATIONS

Japanese-language Written Opinion (PCT/ISA/237) issued in PCT Application No. PCT/JP2021/039611 dated Dec. 21, 2021 (3 pages).

* cited by examiner

[FIG. 1]
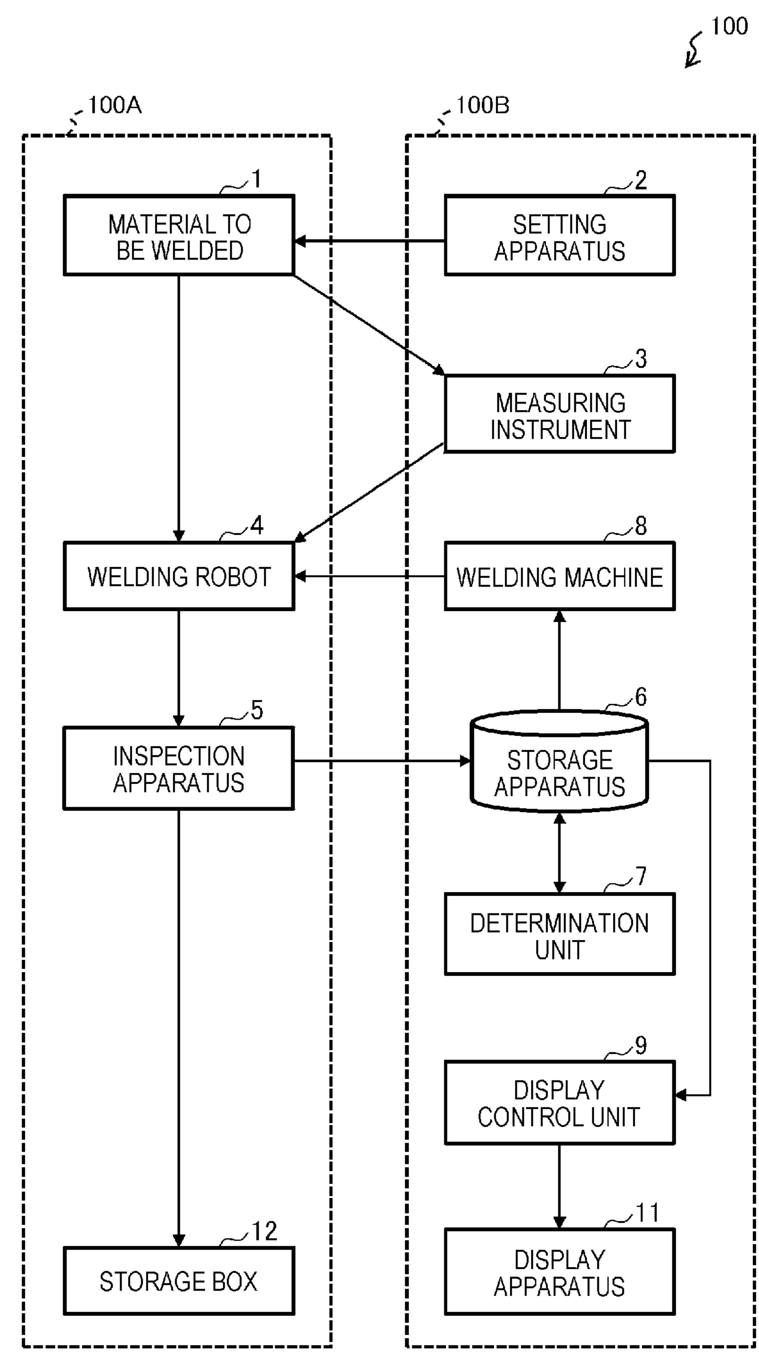

[FIG. 2]
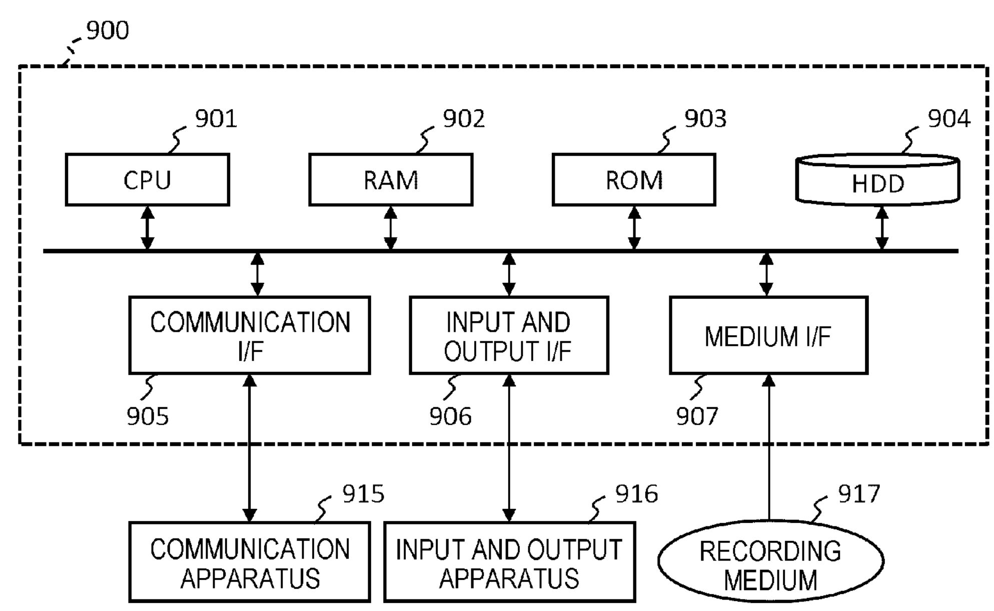
[FIG. 3]
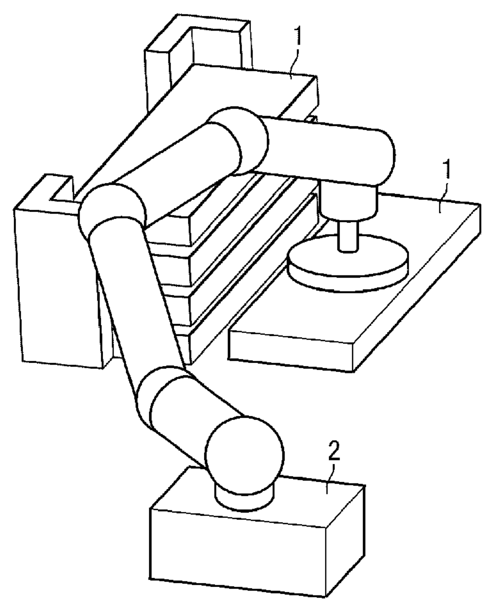

[FIG. 4]
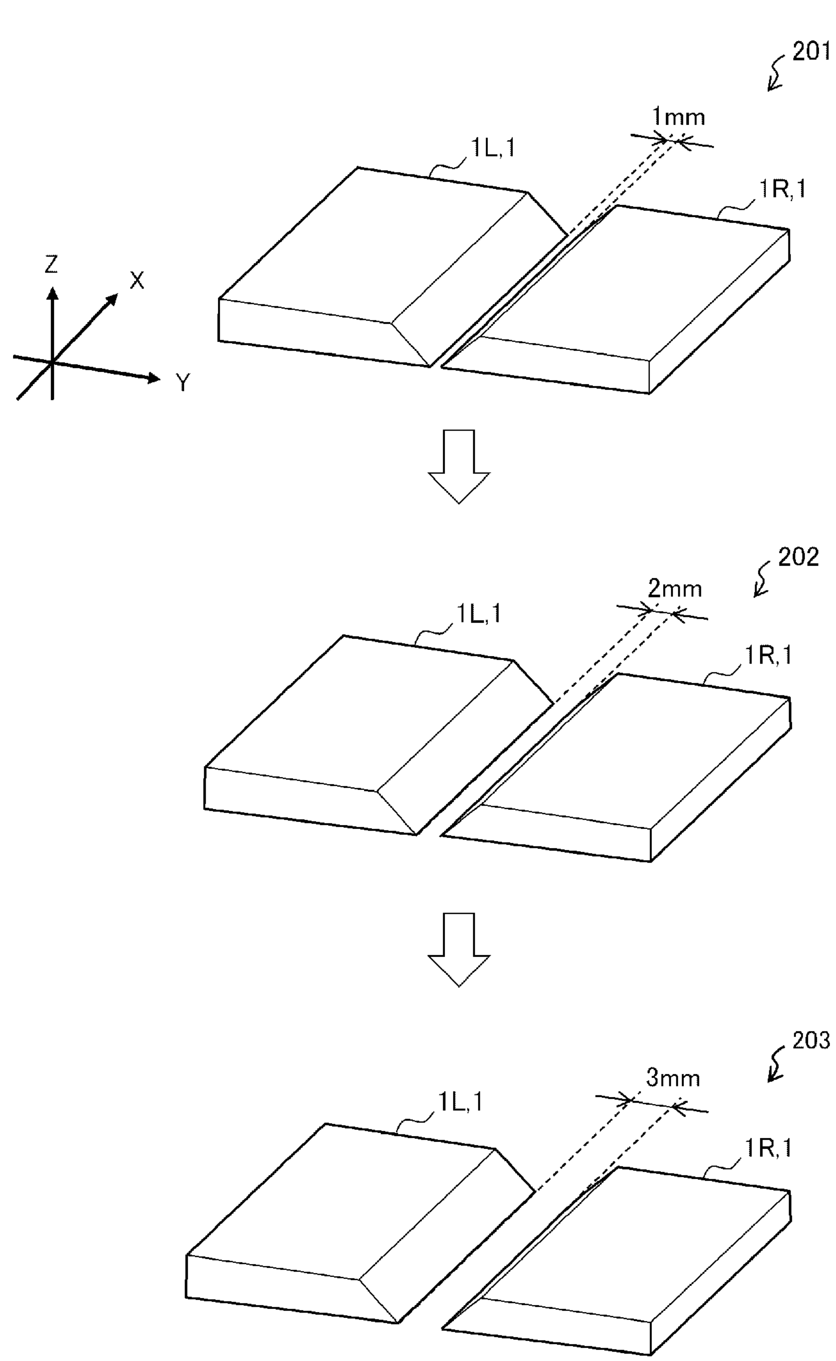

[FIG. 5]
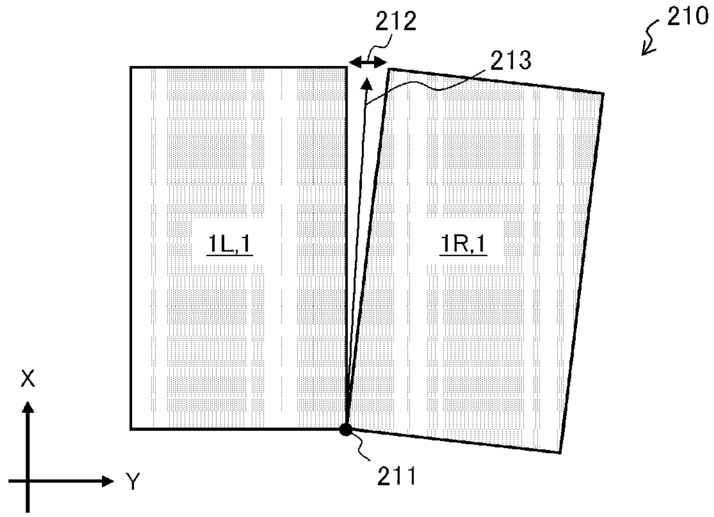
[FIG. 6]
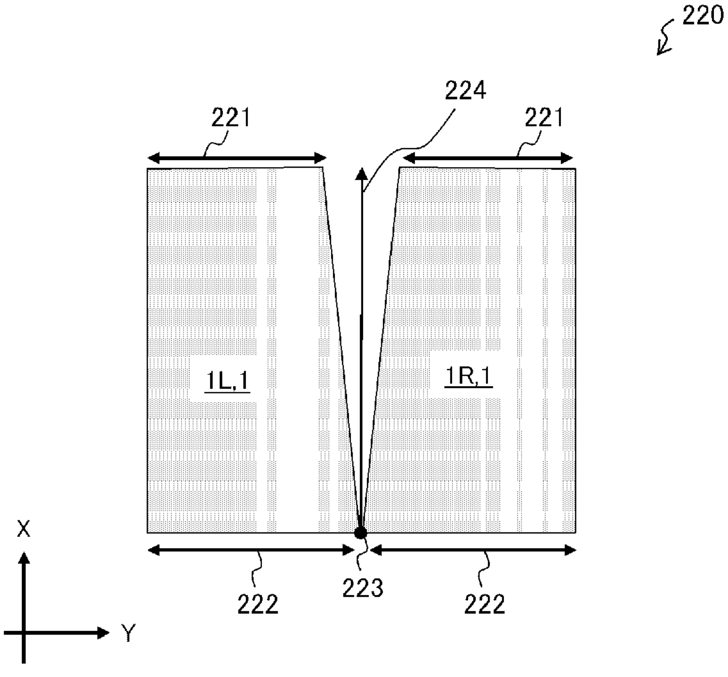

[FIG. 7]
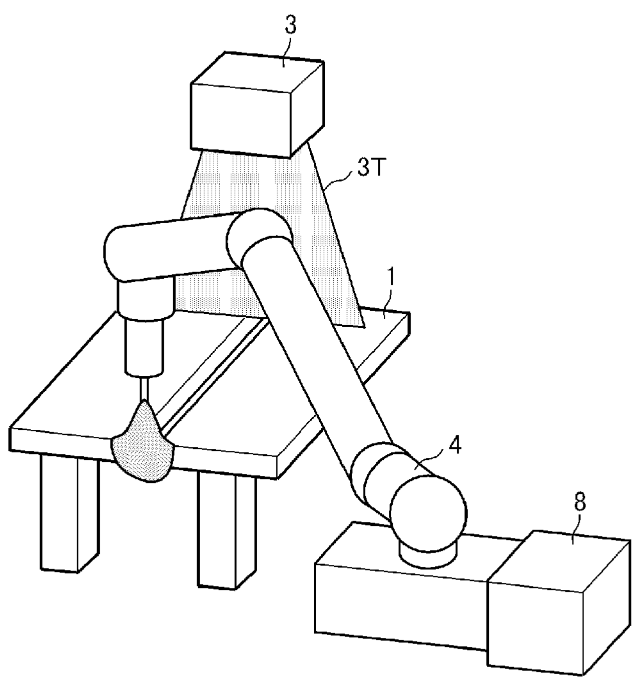

[FIG. 8]
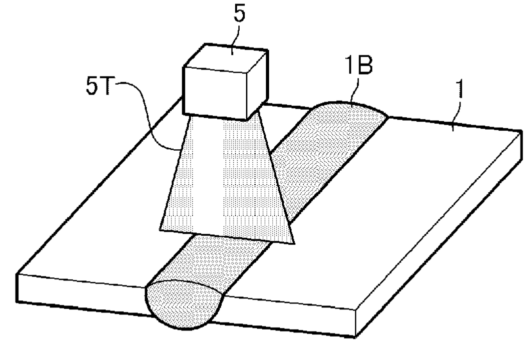
[FIG. 9]
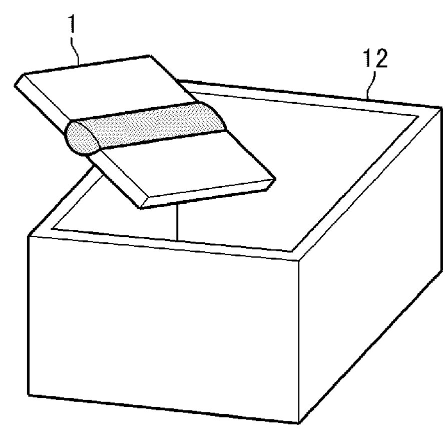

[FIG. 10]
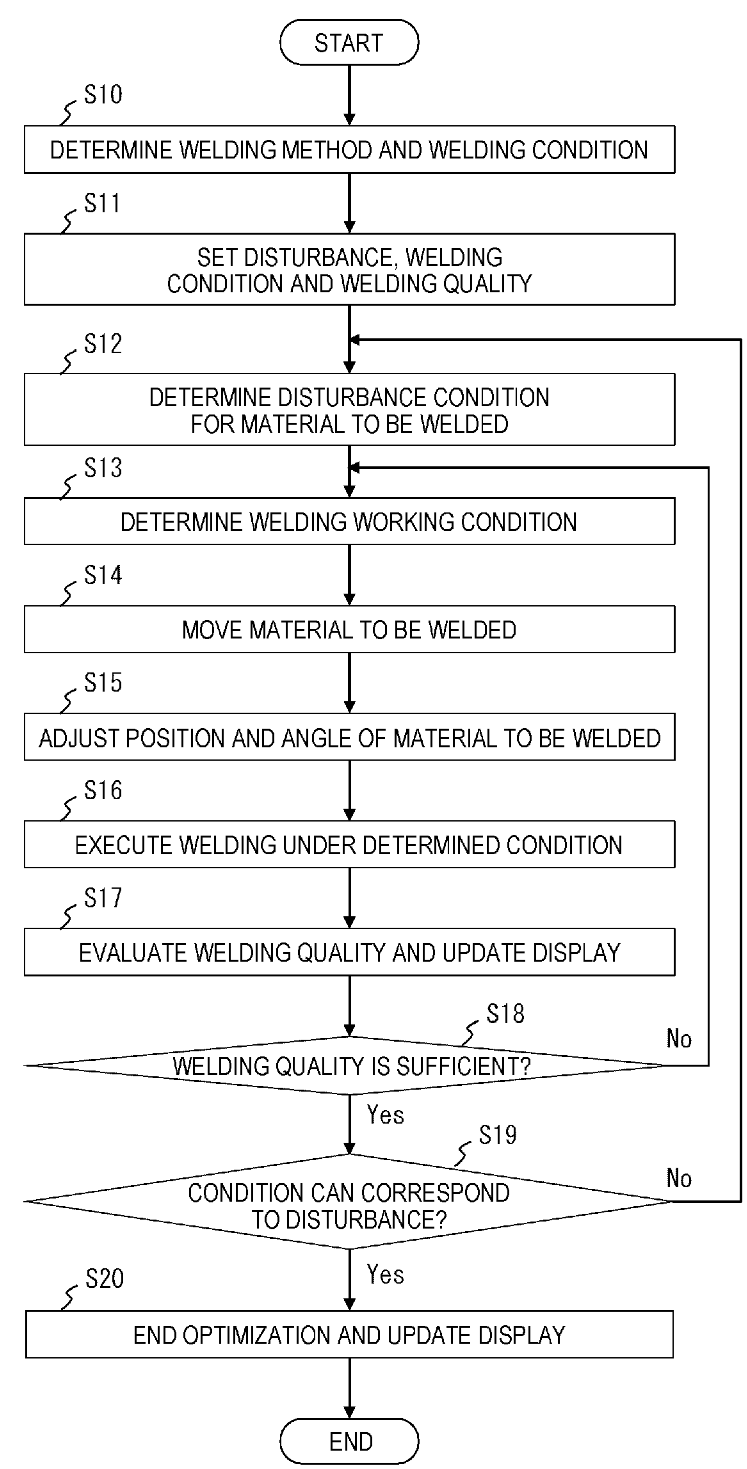

[FIG. 11]

| TRIAL NUMBER | DISTURBANCE CONDITION | WELDING CURRENT | WELDING VOLTAGE | WELDING SPEED | HEIGHT OF PENETRATION BEAD |
|---|---|---|---|---|---|
| 1 | 1 mm | 200 | 25 | 200 | 6mm (LOW QUALITY) |
| 2 | 1 mm | 200 | 25 | 220 | 4 mm |
| 3 | 2 mm | 200 | 25 | 220 | BURN-THROUGH OCCURS (DEFECTIVE) |
| 4 | 2 mm | 200 | 25 | 240 | 3 mm |
| 5 | 3 mm | 200 | 25 | 240 | 2 mm |
| 6 | 4 mm | 200 | 25 | 240 | BURN-THROUGH OCCURS (DEFECTIVE) |
| 7 | 4 mm | 180 | 25 | 280 | NO PENETRATION BEAD (DEFECTIVE) |
| 8 | 4 mm | 180 | 25 | 260 | 1 mm |

[FIG. 12]
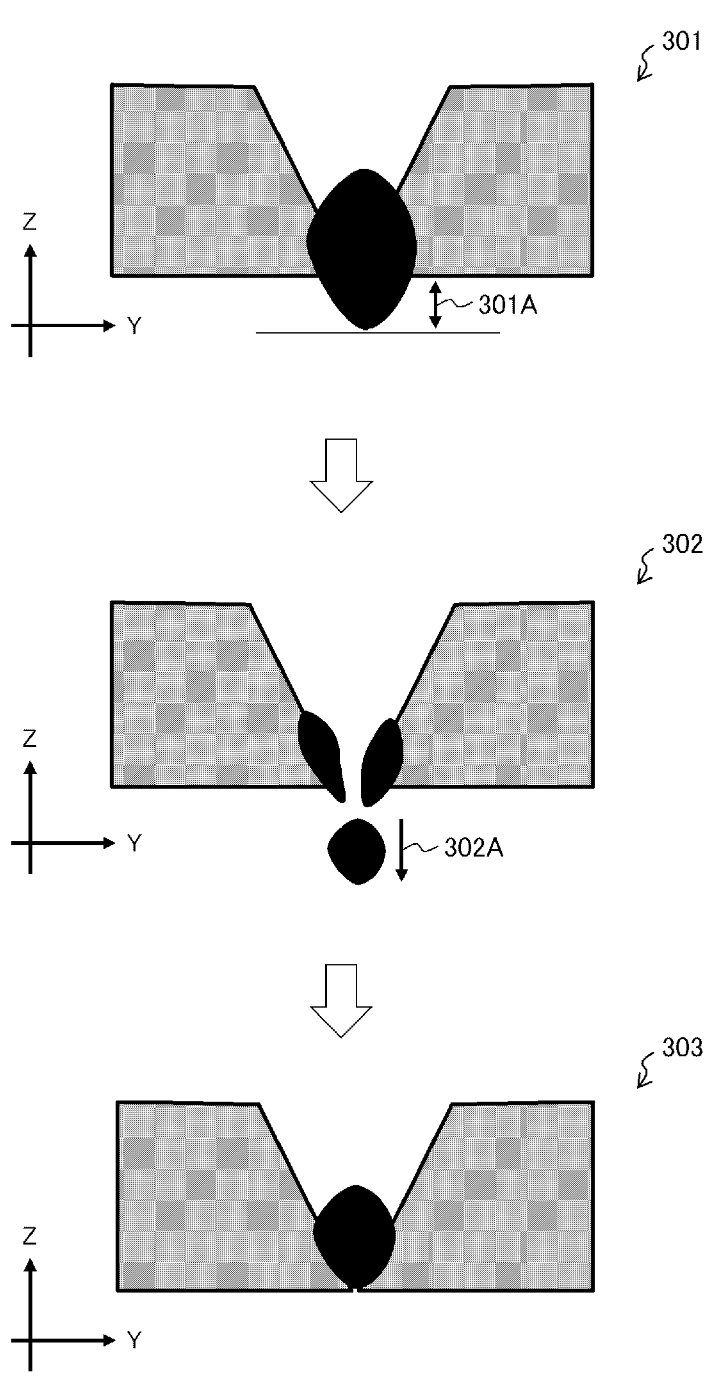

[FIG. 13]
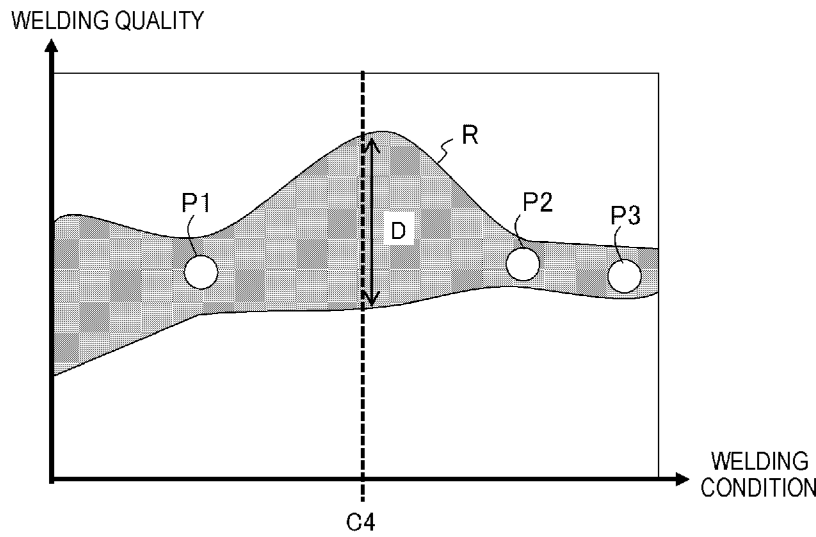
[FIG. 14]
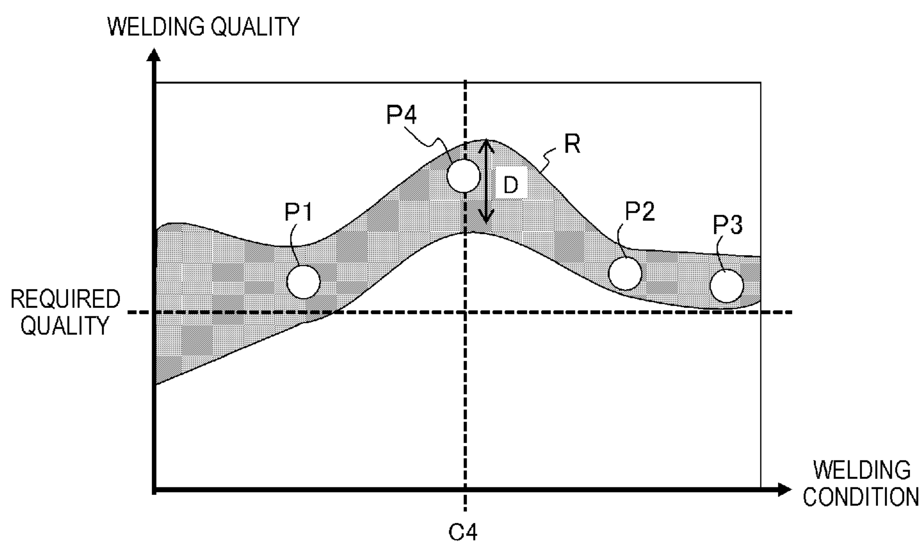

WELDING SYSTEM

TECHNICAL FIELD

The present invention relates to a welding system, a welding condition calculation apparatus, and a welding condition calculation method.

BACKGROUND ART

Along with recent social conditions, an environment for manufacturing is greatly changed. For example, due to an increase in overseas production, an increase in the number of procured products from overseas, and a decrease in the number of skilled engineers, it is difficult to maintain manufacturing skills, and quality control is exposed to a more severe situation.

Accordingly, automation and robotization in the manufacturing industry are further accelerated, and thus an industrial robot market rapidly expands. In the future, with development of computer vision techniques such as image recognition and deep learning techniques that enable autonomous decision-making, automation of the manufacturing industry is expected to be further accelerated.

In addition, a welding operation that is indispensable for the manufacturing industry is an operation requiring a high level of skill, whereas human resource development is time-consuming. Further, due to harsh operation environments, a job retention rate is low and it is particularly difficult to secure human resources.

In recent years, many cameras capable of capturing detailed images of phenomena along with substance movement in a time direction and sensors capable of converting various phenomena into numerical data are developed. A development case is reported in which such cameras and sensors are combined with a computer vision technique or a deep learning technique to autonomously determine a welding condition for a welding robot corresponding to joint properties. Accordingly, it is possible to perform real-time control on the welding robot according to the welding condition.

Meanwhile, in the current manufacturing industry, an appropriate welding condition for a welding robot is created by a skilled engineer familiar with welding phenomena on a trial-and-error basis. Therefore, in order to further automate a welding process, it is conceivable to automate a process of determining an appropriate welding condition.

PTL 1 discloses a machine learning apparatus configured to learn determination of at least one arc welding condition. The machine learning apparatus includes a state observation unit configured to observe a state variable including at least one physical quantity related to arc welding and the at least one arc welding condition during and/or after execution of the arc welding, and a learning unit configured to learn a change in the at least one physical quantity observed by the state observation unit and the at least one arc welding condition in association with each other.

CITATION LIST

Patent Literature

PTL 1: JP2017-30014A

SUMMARY OF INVENTION

Technical Problem

According to a method in PTL 1, instead of directly using one ideal welding condition obtained in advance, a welding condition is changed according to a change in a physical quantity occurring during welding as what is performed by a skilled operator, thereby enabling reduction of welding defects such as bead width unevenness.

Meanwhile, at an operation site of an actual welded structure such as a shipyard or a construction site, various disturbances often occur due to harsh operation environments such as outdoors. A disturbance may occur in a groove portion of a material to be welded due to, for example, deformation or shrinkage caused by a dimensional error of a member and welding heat input. Therefore, in order to make a welding condition follow the disturbance, it is necessary to assume various disturbances in advance and create a wide variety of welding conditions.

However, according to the method in PTL 1, although a method of learning a welding condition by a machine learning device is proposed, setting of learning data, that is, what disturbance is to be used to train the machine is not considered.

Therefore, it is not possible to output a welding condition suitable for a disturbance at an operation site that is not assumed at the time of training. That is, according to the method in PTL 1, it is difficult to efficiently create a condition under which welding can be performed without any defect according to various operation environments.

Therefore, a main object of the invention is to create a welding condition under which a welded structure satisfying a welding quality can be constructed even in an actual operation environment.

Solution to Problem

In order to implement the above object, a welding system according to the invention has the following features.

The invention relates to a welding system including:

- a setting apparatus configured to move, according to a disturbance condition of a material to be welded, the material to be welded to a desired welding position;
- a welding apparatus configured to weld, according to a working condition, the material to be welded moved by the setting apparatus;
- an inspection apparatus configured to inspect a welding quality of the material to be welded that is welded at a current time;
- a storage apparatus configured to store the working condition for the current time, the disturbance condition for the current time, and the welding quality of the current time in association with one another; and
- a welding condition calculation apparatus configured to change, when the welding quality of the current time stored in the storage apparatus satisfies a predetermined required quality, the corresponding disturbance condition for the current time and set the changed disturbance condition as a disturbance condition for a next time.

Other means will be described later.

Advantageous Effects of Invention

According to the invention, it is possible to create a welding condition under which a welded structure satisfying a welding quality can be constructed even in an actual operation environment.

BRIEF DESCRIPTION OF DRAWINGS

FIG. 1 is a configuration diagram showing a welding system according to an embodiment.

FIG. 2 is a configuration diagram showing hardware of the welding system according to the embodiment.

FIG. 3 is an external view of a setting apparatus according to the embodiment.

FIG. 4 is a three-dimensional view showing a first example in which the setting apparatus according to the embodiment sets a material to be welded before welding.

FIG. 5 is a plan view showing a second example in which the setting apparatus according to the embodiment sets the material to be welded before welding.

FIG. 6 is a plan view showing a third example in which the setting apparatus according to the embodiment sets the material to be welded before welding.

FIG. 7 is an external view showing a measuring instrument according to the embodiment.

FIG. 8 is an external view showing an inspection apparatus according to the embodiment.

FIG. 9 is an external view showing a storage box according to the embodiment.

FIG. 10 is a flowchart showing a welding condition optimization process according to the embodiment.

FIG. 11 is a table showing an example of measurement result data according to the embodiment.

FIG. 12 is an external view showing a specimen when a required quality in the measurement result data in FIG. 11 according to the embodiment is not satisfied.

FIG. 13 shows an example of a display screen of a display apparatus according to the embodiment.

FIG. 14 shows an example of a display screen to which a fourth test result is added after the state in FIG. 13 according to the embodiment.

DESCRIPTION OF EMBODIMENTS

An embodiment will be described using the following terms.

The term "welding condition" is a parameter measured when a welding operation is performed, and is classified into "working condition" that can be explicitly controlled by a welding operator and "disturbance condition" that accidentally occurs according to an environment (disturbance) during welding.

The "working condition" is exemplified as follows.

Welding speed, welding current, and welding voltage

Welding wire feeding speed, wire protrusion length, welding wire target position, and welding wire target angle Shielding gas composition and shielding gas flow rate Arc shape Weaving width and weaving period Joint type The "disturbance condition" is exemplified as follows.

Setting position of material to be welded. Such a setting position is measured by a contact type or non-contact type displacement meter.

Setting angle of material to be welded

Groove position

Groove shape

Disturbance type (gap, difference, angular deformation) and magnitude of such type of disturbance The term "welding quality" is an index for evaluating a specimen as a result of welding according to the welding condition, and is a quality measured from an appearance of the specimen or a quality measured from inside the specimen. The welding quality is exemplified as follows.

Presence or absence and size of external defects such as underfill and undercut

Presence or absence and size of internal defects such as blowholes and pits

Dimension and shape of welding bead

The term "required quality" is a criterion that the calculated welding quality is to satisfy, for example, when the welding quality is a numerical value, the required quality is set as a threshold value that the numerical value is to exceed.

Hereinafter, the embodiment will be described with reference to the drawings. In the following drawings, the same reference numerals are assigned. In order to facilitate understanding, a scale of the drawings is appropriately changed.

FIG. 1 is a configuration diagram showing a welding system 100. The welding system 100 includes an operation line 100A on which a material to be welded 1 is welded by a welding robot 4, inspected by an inspection apparatus 5, and stored in a storage box 12 when passing the inspection.

The welding system 100 further includes, as a welding condition creation mechanism 100B, a setting apparatus 2, a measuring instrument 3, a storage apparatus 6, a determination unit (welding condition calculation apparatus) 7, a welding machine 8, a display control unit 9, and a display apparatus 11. Hereinafter, an example in which the welding robot 4 performs welding as a welding apparatus will be described.

The material to be welded 1 can have any shape as long as the material to be welded 1 can be conveyed by the setting apparatus 2, and is, for example, a flat steel plate including a V groove.

The setting apparatus 2 and the welding robot 4 may be, for example, vertical articulated robots (to be described later in FIGS. 3 and 7) or motor mechanisms.

The determination unit 7 is implemented by, for example, an arithmetic processing unit (for example, a CPU) and a program executed by the arithmetic processing unit.

The storage apparatus 6 stores data on the welding condition and the welding quality, and is implemented as, for example, a semiconductor memory such as a ROM or a RAM or a magnetic storage apparatus such as an HDD.

The display control unit 9 displays, on the display apparatus 11, a progress and a result of optimization of the welding condition and the data stored in the storage apparatus 6. The display apparatus 11 is, for example, a monitor or a touch panel. The storage apparatus 6, the determination unit 7, and the display control unit 9 may be implemented as the same apparatus.

FIG. 2 is a configuration diagram showing hardware on which a computer 900 operates in order to operate the determination unit 7 of the welding system 100.

The computer 900 includes a CPU 901, a RAM 902, a ROM 903, an HDD 904, a communication I/F 905, an input and output I/F 906, and a medium I/F 907.

The communication I/F 905 is connected to an external communication apparatus 915. The input and output I/F 906 is connected to an input and output apparatus 916. The medium I/F 907 reads and writes data from and to a recording medium 917. Further, the CPU 901 controls each processing unit by executing a program (also referred to as an application or an APP that is an abbreviation thereof) read onto the RAM 902. The program can also be distributed via a communication line or can be recorded and distributed in the recording medium 917 such as a CD-ROM.

FIG. 3 is an external view showing the setting apparatus 2. The setting apparatus 2 is a conveyance robot for the material to be welded 1. The setting apparatus 2 receives information on a current position and a current angle of the material to be welded 1 from the measuring instrument 3 and adjusts a setting position of the material to be welded 1 in order to satisfy a determined disturbance condition of the material to be welded 1. Only one setting apparatus 2 is shown in the drawings, and there may also be two setting apparatuses 2 corresponding to two materials to be welded 1 to fix the materials to be welded 1 during welding.

In addition, since a portion of the setting apparatus 2 that holds the material to be welded 1 before welding and the specimen after welding is connected to a ground of the welding machine 8 by a conductor, it is not necessary to attach a ground to the material to be welded 1.

FIG. 4 is a three-dimensional view showing a first example in which the setting apparatus 2 sets the material to be welded 1 before welding.

An X-axis in the three-dimensional view is a direction along a welding line of the material to be welded 1, a Y-axis is a direction orthogonal to the X-axis on a plane of the material to be welded 1, and a Z-axis is a height direction of the material to be welded 1. Here, as an example of the disturbance condition of the material to be welded 1, a case where a groove gap of the material to be welded 1 is increased by a certain width will be described.

The determination unit 7 executes an algorithm such that the groove gap of the material to be welded 1 increases by a certain width starting with one having the least difficulty (smallest disturbance). This algorithm follows a rule that at least one or more disturbances that make it difficult to perform normal welding are increased by a predetermined certain width when the welding quality is acceptable (when a predetermined threshold value is satisfied).

For example, in a first test, as indicated by a reference numeral 201, a groove gap between a material to be welded 1L on a left side and a material to be welded 1R on a right side is set to 1 mm, which is given in advance. In a second test after passing the first test, as indicated by a reference numeral 202, the groove gap is set to 2 mm, and in a third test after passing the second test, the groove gap is set to 3 mm as indicated by a reference numeral 203. Accordingly, as the number of times of experiments advances, it is more difficult to perform normal welding, and thus an actual severe welding site can be simulated.

FIG. 5 is a plan view showing a second example in which the setting apparatus 2 sets the material to be welded 1 before welding.

As indicated by a reference numeral 210, the groove gap between the material to be welded 1L on the left side and the material to be welded 1R on the right side is 0 mm (close contact) at a start point 211 of a welding line 213. The groove gap increases as the welding line 213 advances and has a width 212 which makes it difficult to perform normal welding at an end point of the welding line 213.

The material to be welded 1L on the left side and the material to be welded 1R on the right side have the same shape and are set to be tapered at an angle to each other. In a first test, a portion close to the start point 211 of the welding line 213 is welded. Then, each time the number of times of experiments advances, a portion on the welding line 213 away from the start point 211 is welded. Accordingly, the disturbance is changed such that normal welding gradually becomes more difficult toward a latter half of a welding process.

FIG. 6 is a plan view showing a third example in which the setting apparatus 2 sets the material to be welded 1 before welding.

As indicated by a reference numeral 220, the groove gap between the material to be welded 1L on the left side and the material to be welded 1R on the right side is 0 mm (close contact) at a start point 223 of a welding line 224 and increases as the welding line 224 advances.

The material to be welded 1L on the left side has an upper side 221 thereof shorter than a lower side 222 thereof, and a right side of the material to be welded 1L moves away from the welding line 224 as the welding line 224 advances. Similarly, the material to be welded 1R on the right side has the upper side 221 thereof shorter than the lower side 222 thereof, and a left side of the material to be welded 1R moves away from the welding line 224 as the welding line 224 advances. In this way, a shape (dimension) of the material to be welded 1 is processed in advance to gradually change along the welding line 224.

Similarly to FIG. 5, in FIG. 6, a portion close to the start point 223 of the welding line 224 is welded in a first test, and a portion on the welding line 224 away from the start point 223 is welded each time the number of times of experiments advances.

By setting the material to be welded 1 as shown in FIG. 5 or FIG. 6, a plurality of tests (under a plurality of types of disturbance conditions) can be efficiently executed using the one left and right set of materials to be welded 1. FIG. 6 shows an example in which the groove gap is changed as the shape of the material to be welded 1 that is changed along the welding line 224.

Meanwhile, a plate thickness, a groove angle, a groove width, a groove depth, or a root face height may be adopted as another changing shape of the material to be welded 1. Further, a plurality of types of shapes (the groove gap, the groove depth, and the like) may be changed along the welding line 224.

FIG. 7 is an external view showing the measuring instrument 3. The measuring instrument 3 is implemented as, for example, a laser displacement meter that emits a scanning signal 3T to the material to be welded 1. The measuring instrument 3 measures a position and an angle of the material to be welded 1 held by the setting apparatus 2.

The welding condition creation mechanism 100B determines a trajectory of the welding robot 4 during welding based on position information on the material to be welded 1 acquired by the measuring instrument 3. Therefore, a teaching operation of the welding robot 4 may be omitted.

Referring back to FIG. 1, the determination unit 7 determines a combination of the working condition and the disturbance condition as the welding condition for each experiment. As for the working condition, a welding condition under which a next test is to be performed is determined based on a predetermined range of the working condition and a test result of a current time (the welding condition and the welding quality) stored in the storage apparatus 6. In this determination process, welding knowledge of a skilled worker may be used, such as lowering a current, increasing a speed, or lengthening a protrusion when burn-through occurs.

The disturbance condition of the material to be welded 1 may be any condition as long as the specimen welded under the welding condition satisfies a predetermined quality.

The welding machine 8 operates the welding robot 4 to join the material to be welded 1 according to a joining method such as fusion welding, pressure welding, or brazing.

The storage apparatus 6 associates the welding condition determined by the determination unit 7 with information on the welding quality measured by the inspection apparatus 5, and stores the associated information as a test result of the current time. The welding condition and the welding quality are stored in a three-axis coordinate system of a robot operation in association with each other.

FIG. 8 is an external view showing the inspection apparatus 5. The inspection apparatus 5 measures the welding quality after welding by emitting a scanning signal 5T to the material to be welded 1. The inspection apparatus 5 uses, for example, a method listed below as a method for measuring the welding quality.

Measurement of joint three-dimensional shape in welding line direction using laser scanner including encoder Welding bead measurement on scale Appearance inspection using laser displacement meter Appearance inspection based on image processing on welding appearance Radiation ray transmission test Ultrasonic transmission test Magnetic flaw detection test Permeation flaw detection test Electromagnetic induction flaw detection test Acoustic emission method Crack sensitivity test In addition, the welding condition creation mechanism 100B assumes a method capable of associating predetermined position information continuous in a joint longitudinal direction, which is measured by a linear encoder or the like, with position information in the welding condition during measurement.

FIG. 9 is an external view showing the storage box 12. The material to be welded 1 passing the welding quality inspection is stored in the storage box 12.

FIG. 10 is a flowchart showing a welding condition optimization process executed by the determination unit 7.

In S10, a user determines a welding method and a basic welding condition (the working condition and the disturbance condition). The working condition or the disturbance condition in the welding condition determined here may be fixed such that the welding condition or the disturbance condition is not changed in the optimization process after S11.

As the working condition in S10 used for welding execution for a first time, it is desirable to use a working condition that is a measurement result of a welding operation performed by a welding operator in the past. Accordingly, an appropriate value can be set as an initial value of the optimization process of the current time and thus the number of times of execution of the optimization process can be reduced.

In S11, the user sets a range that the disturbance condition can take, a range that the working condition can take, and a required quality indicating an acceptable welding quality. It is desirable to set the disturbance of the material to be welded 1 to such a magnitude that can occur in an actual environment, and it is desirable to determine quality items and a required quality required in an actual process as the welding quality.

In S12, the determination unit 7 determines the disturbance condition for the material to be welded 1 used in the test of the current time. As shown in FIGS. 4 to 6, it is assumed that a disturbance value of the disturbance condition is determined such that the disturbance value starts from a small value at which welding is relatively easy and increases to the range set in S11 that the disturbance condition can take.

In S13, the determination unit 7 determines the working condition used in the test of the current time based on test results up to a previous time (information on the welding condition and the welding quality) stored in the storage apparatus 6. For example, the determination unit 7 sets a parameter that maximizes a probability distribution of the working condition satisfying the required quality based on Bayesian statistics. One of the following can be set as the working condition under which welding for a first time is to be executed.

A median value of a range that each working condition determined by the user can take.

A condition appropriately determined by the user.

A condition determined by sensing the working condition of the user.

In S14, the setting apparatus 2 (a unit configured to convey the material to be welded 1) moves the material to be welded 1 to a welding execution position. Therefore, the setting apparatus 2 includes a mechanism that mechanically clamps the material to be welded 1 or a mechanism that lifts the material to be welded 1 with an electromagnet (FIG. 3).

In S15, the measuring instrument 3 measures a current position and a current angle of the material to be welded 1 and transmits such information to the setting apparatus 2. The setting apparatus 2 that receives the information adjusts a position and an angle of the material to be welded 1 to satisfy the disturbance condition determined in S12. At a time point when a result of the adjustment is as determined by the disturbance condition, the process proceeds to S16.

In S16, the welding robot 4 and the welding machine 8 execute welding under the welding condition determined in S12 and S13. In a case where the shape of the material to be welded 1 is processed as shown in FIG. 6, or in a case where the shape changes along the welding line since the material to be welded 1 is set to be tapered as shown in FIG. 5, a working condition that is not steady along the welding line is set in the welding machine 8 in S13.

In S17, the inspection apparatus 5 measures the welding quality of the specimen as a result of welding the material to be welded 1 in S16. The measured welding quality is stored in the storage apparatus 6 in association with the welding condition determined in S13 and a coordinate system on the welding line. The display control unit 9 updates a display screen of the display apparatus 11 by stored contents in the storage apparatus 6 (to be described later in FIGS. 13 and 14).

In S18, the determination unit 7 confirms whether the welding quality stored in S17 satisfies the required quality determined in S11. If the required quality is satisfied, the process proceeds to S19. If the required quality is not satisfied, the process returns to S13.

In S19, the determination unit 7 confirms whether creation of the welding condition under which welding can be normally performed within a range that the disturbance condition determined in S11 can take (or a range that the working condition can take) is completed. If the creation is completed, the process proceeds to S20. If the creation is not completed, the process returns to S12.

In S20, the display control unit 9 completes the optimization process of the welding condition and displays, on the display apparatus 11, contents in FIGS. 11 to 14 to be described later, thereby reporting the optimized welding condition to the user. In addition to the result of the optimization process, the display control unit 9 may also display progress leading up to the completion of the optimization process.

When there are a plurality of setting apparatuses 2 and welding apparatuses (the welding robot 4 and the welding machine 8), the processes in S13 to S18 are executed in parallel for a plurality of conditions.

FIG. 11 is a table showing an example of measurement result data stored in the storage apparatus 6 in S17.

The measurement result data is implemented by associating, for each trial number indicating the number of times of experiments, the groove gap that is the disturbance condition in the experiment, the working condition (a welding current, a welding voltage, and a welding speed), and a height of a penetration bead that indicates the welding quality.

Here, pass or fail of each experiment is determined based on the required quality, that is, no defect and a height of the penetration bead of 5 mm or less. As a result, trial numbers=2, 4, 5, and 8 pass, and trial numbers=1, 3, 6, and 7 fail. As shown in FIG. 4, the determination unit 7 sets the disturbance condition such that the groove gap is increased by 1 mm each time the number of times of experiments advances.

The determination unit 7 executes a welding process in which the material to be welded 1 is set at a desired welding position according to the disturbance condition simulating a disturbance and then the welding robot 4 performs welding under the working condition.

When the welding quality of the material to be welded as a result of the welding process of a current time (trial number=1) does not satisfy the predetermined required quality, the determination unit 7 changes the working condition and executes the welding process of a next time (trial number=2).

When the welding quality of the material to be welded as a result of the welding process of the current time (trial number=2) satisfies the predetermined required quality, the determination unit 7 changes the disturbance condition to a more severe one and executes the welding process of a next time (trial number=3).

FIG. 12 is an external view showing the specimen when the required quality in measurement result data in FIG. 11 is not satisfied.

A reference numeral 301 indicates an example in which, as a welding quality of the trial number=1, a penetration bead 301A has a height of 6 mm, which does not satisfy the required quality of 5 mm or less.

A reference numeral 302 indicates an example in which, as a welding quality of the trial number=3, a burn-through 302A occurs, which does not satisfy the required quality.

A reference numeral 303 indicates an example in which, as a welding quality of the trial number=7, there is no penetration bead, which does not satisfy the required quality.

FIG. 13 shows an example of the display screen of the display apparatus 11. A Y-axis in the graph represents the welding quality, and an X-axis represents the welding condition (the working condition or the working condition changed in each test in the current optimization process). The welding condition on the X-axis may be subject to constraints such as robot posture and heat input amount.

Instead of the two-dimensional graph in FIG. 13, a three-dimensional graph in which X-axis=disturbance condition, Y-axis=working condition, and Z-axis=welding quality may be used.

Three test results in the past are represented by P1 to P3. A probability distribution R indicates a region in which a combination of the welding condition and the welding quality may occur. When the test results P1 to P3 are known, the probability distribution R is narrowed down to the vicinity of the test results P1 to P3. In a fourth test, the welding quality at a search point (welding condition C4) where the test results P1 to P3 do not exist is narrowed down from a width D.

FIG. 14 shows an example of the display screen of the display apparatus 11 to which a fourth test result is added after the state in FIG. 13.

According to a test result P4 acquired this time, the probability distribution R is narrowed to the vicinity of the test result P4, and the width D is narrowed. In this way, each time a test result is added, the probability distribution R is narrowed down. In addition, the required quality is also displayed on the display screen in FIG. 14.

The welding system 100 may use the welding condition stored in the storage apparatus 6 as a result of the optimization process of the welding condition not only for the user to confirm on the display screen but also as a control parameter used at an actual welding site (for the welding robot 4 and the welding machine 8 that serve as a site welding apparatus).

Accordingly, by creating a wide variety of welding conditions in advance on the assumption of various disturbances, a welded structure satisfying a welding quality can be constructed even in an actual operation environment.

In the embodiment described above, the determination unit 7 simulates various disturbance conditions assuming an actual welding site in an experimental stage. Accordingly, the welding condition under which welding can be performed to satisfy the required quality even at an actual welding site can be prepared in advance before going to the actual welding site.

The invention is not limited to the above embodiment and includes various modifications. For example, the embodiment described above has been described in detail to facilitate understanding of the invention, and the invention is not necessarily limited to those including all the configurations described above.

In addition, a part of the configuration of one embodiment can be replaced with the configuration of another embodiment, and the configuration of another embodiment can be added to the configuration of one embodiment.

In addition, a part of the configuration of each embodiment may be added to, deleted from, or replaced with another configuration. In addition, a part or all of the above configurations, functions, processing units, processing methods, and the like may be implemented by hardware, for example, by designing an integrated circuit.

In addition, each of the above configurations, functions, and the like may be implemented by software by a processor interpreting and executing a program for implementing each function.

Information such as a program, a table, or a file for implementing each function can be stored in a recording apparatus such as a memory, a hard disk, or a solid-state drive (SSD), or in a recording medium such as an integrated circuit (IC) card, an SD card, and a digital versatile disc (DVD). A cloud can also be used.

In addition, control lines or information lines indicate what is considered necessary for description, and not all the control lines or information lines are necessarily shown on a product. Actually, it may be considered that almost all the configurations are connected to each other.

Further, a communication unit connecting each apparatus is not limited to a wireless LAN and may be changed to a wired LAN or another communication unit.

REFERENCE SIGNS LIST

1: material to be welded
1B: bead
2: setting apparatus

3: measuring instrument
3T: scanning signal
4: welding robot (welding apparatus)
5: inspection apparatus
5T: scanning signal
6: storage apparatus
7: determination unit (welding condition calculation apparatus)
8: welding machine
9: display control unit
11: display apparatus
12: storage box
100: welding system

The invention claimed is:

1. A welding system comprising:

a setting apparatus configured to move, according to a disturbance condition of a material to be welded, the material to be welded to a desired welding position;

a welding apparatus configured to weld, according to a working condition, the material to be welded moved by the setting apparatus;

an inspection apparatus configured to inspect a welding quality of the material to be welded that is welded at a current time;

a storage apparatus configured to store the working condition for the current time, the disturbance condition for the current time, and the welding quality of the current time in association with one another; and a welding condition calculation apparatus configured to change, when the welding quality of the current time stored in the storage apparatus satisfies a predetermined required quality, the corresponding disturbance condition for the current time and set the changed disturbance condition as a disturbance condition for a next time.

2. The welding system according to claim 1, wherein the welding condition calculation apparatus reads, from the storage apparatus, a working condition used by a welding operator in another welding process in the past, and uses the read working condition as an initial working condition corresponding to an initial disturbance condition.

3. The welding system according to claim 1, wherein the welding condition calculation apparatus sets, as the working condition for the current time, a working condition from data stored in the storage apparatus that maximizes a probability distribution of a working condition satisfying a required quality based on Bayesian statistics.

4. The welding system according to claim 1, wherein the welding condition calculation apparatus sets, as the disturbance condition for the next time, a disturbance condition changed from the disturbance condition for the current time to make normal welding more difficult than that under the disturbance condition for the current time.

5. The welding system according to claim 1, wherein the setting apparatus makes a groove gap increases as a welding line of the material to be welded advances, by setting the material to be welded to be tapered, and the welding condition calculation apparatus sets, as a welding position corresponding to the groove gap set in the disturbance condition for the next time, a position at which the groove gap further increases on a side where the welding line advances than that at a welding position corresponding to the groove gap set in the disturbance condition for the current time.

6. The welding system according to claim 1, wherein the setting apparatus moves the material to be welded, which is processed such that a shape thereof gradually changes along a welding line of the material to be welded, to a desired welding position, and the welding condition calculation apparatus determines the welding position of the material to be welded based on a disturbance condition affected by the shape of the material to be welded.

7. The welding system according to claim 1, further comprising:

a site welding apparatus configured to read, from the storage apparatus, a working condition corresponding to a disturbance condition at a welding site and perform welding according to the working condition.

* * * * *